US006439628B1

(12) United States Patent
Eslambolchi et al.

(10) Patent No.: US 6,439,628 B1
(45) Date of Patent: Aug. 27, 2002

(54) MANHOLE COVER REMOVAL TOOL

(75) Inventors: Hossein Eslambolchi, Los Altos Hills, CA (US); John Sinclair Huffman, Conyers, GA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/811,860

(22) Filed: Mar. 19, 2001

(51) Int. Cl.[7] .................... B65G 7/12

(52) U.S. Cl. .................... 294/17; 294/34; 254/131

(58) Field of Search .................... 294/3, 15, 16, 294/17, 62, 34, 168, 119.1; 254/131, 119, 120, 129, 131.5, 132

(56) References Cited

U.S. PATENT DOCUMENTS

| | | | | |
|---|---|---|---|---|
| 1,933,384 A | * 10/1933 | Moylan | 294/17 |
| 2,086,318 A | * 7/1937 | Jackson | 294/17 |
| 2,176,251 A | * 10/1939 | Duhan | 294/119.1 |
| 2,348,978 A | * 5/1944 | Kinner | 294/17 |
| 2,832,628 A | * 4/1958 | Turnbull | 294/17 |
| 2,846,259 A | * 8/1958 | Sadler | 294/15 |
| 3,261,479 A | * 7/1966 | Baker et al. | 294/119.1 |
| 3,414,311 A | * 12/1968 | Trimboli | 294/34 |
| 3,957,247 A | 5/1976 | Haller et al. | |
| 3,985,338 A | 10/1976 | Herrmann | |
| 4,076,217 A | 2/1978 | Haller et al. | 254/131 |
| 4,157,809 A | 6/1979 | Haller et al. | |
| 4,157,810 A | 6/1979 | Haller et al. | |
| 4,157,811 A | 6/1979 | Haller et al. | |
| 4,181,290 A | * 1/1980 | Affolter | 254/131 |
| 4,227,731 A | 10/1980 | Castle | |
| 4,321,003 A | * 3/1982 | Castle | 254/131 |
| 4,365,925 A | 12/1982 | Girtz | |
| 4,482,182 A | * 11/1984 | Mortensen | 294/15 |
| 4,488,706 A | 12/1984 | Kono | |
| 4,650,232 A | 3/1987 | Perry | |
| 4,746,098 A | * 5/1988 | Abarotin | 254/131 |
| 4,826,388 A | 5/1989 | Golding | |
| 4,991,893 A | * 2/1991 | Gordon et al. | 294/17 |
| 5,004,282 A | * 4/1991 | Perry | 294/17 |
| 5,070,564 A | * 12/1991 | Fey | 294/17 |
| 5,775,674 A | 7/1998 | Bigham | 254/131 |
| 5,788,406 A | 8/1998 | Hernandez | 404/25 |
| 5,865,425 A | 2/1999 | Meadows | |
| 6,209,936 B1 | * 4/2001 | Radke | 294/17 |

FOREIGN PATENT DOCUMENTS

NO 69736 * 11/1945

* cited by examiner

*Primary Examiner*—Eileen D. Lillis
*Assistant Examiner*—Paul T. Chin
(74) *Attorney, Agent, or Firm*—Wendy W. Koba

(57) ABSTRACT

A manhole cover lifting tool includes three separate pieces that are mated together to allow for the entire cover to be lifted in one motion. A pair of hook arms are inserted over opposing holes in the manhole cover and joined together. A lifting arm is then attached to the joined hook arms and used to remove the cover from the opening.

3 Claims, 1 Drawing Sheet

MANHOLE COVER REMOVAL TOOL

TECHNICAL FIELD

The present invention relates to a tool for removing the cover from a manhole and, more particularly, to a tool which locks onto the periphery of a manhole cover and includes a lifting arm for safety removing the cover.

BACKGROUND OF THE INVENTION

Manhole covers, although particularly well-known with regard to sewer systems, are also used in association with a variety of different types of in-ground installations, for example, water, electric, cable, telephone, water main supply valves, transformers, and the like. To gain access to the equipment/installation underneath the ground, one must first lift and then remove the manhole cover. The covers most generally are fabricated from cast iron or reinforced concrete and as a result are heavy and difficult to maneuver, most weighing over 150 pounds. Conventional manhole covers generally have at least two holes near to the outer circumferential edge of the cover for use in removing the cover from the entrance hole. In position, the cover is seated in a cover support ring situated such that the cover and the ring are substantially in the plane of the surrounding surface, such as that of the road or sidewalk surface.

The technique generally used in the prior art for lifting a manhole cover is to use a crow bar, trap hook, or similar rod-like tool that is inserted in one of the circumferential edge holes. The crow bar is then used to pry a portion of the cover away from the opening, where an individual then grabs the cover, lifts and rolls the cover out of the way. In most cases, very little control over the movement of the cover can be maintained and, furthermore, there is always the chance that the cover may drop off the tool and injure the operator, for example, by falling on his legs or feet.

The prior art is replete with various tools to aid in removing manhole covers. See, for example, U.S. Pat. No. 4,076,217, "Apparatus for Lifting a Manhole Cover"; U.S. Pat. No. 4,991,893, "Manhole Cover Lifting Device"; U.S. Pat. No. 5,775,674, "Lift Apparatus Having a Pivoting Pole for Lifting and Moving a Manhole Cover"; and U.S. Pat. No. 5,788,406, "Double Pivot Semi-Automatic Manhole Cover Lifting Device". However, in most instances, only one side of the lid is "grabbed" and can always result in the lid separating from the tool. Thus, a need remains in the prior art for an efficient, simple manhole cover removal tool that grabs more of the cover surface and reduces the chances for injury during removal.

SUMMARY OF THE INVENTION

The need remaining in the prior art is addressed by the present invention, which relates to a tool for removing the cover from a manhole and, more particularly, to a tool which locks onto the periphery of a manhole cover and includes a lifting arm for safely removing the cover.

In accordance with the present invention, a manhole cover removal tool comprises a pair of hook arms, where the hook portion of each arm engages with one of the removal openings formed on the manhole top surface. One of the arms includes a locking collar, or similar arrangement, for joining together the two arms once they are inserted in the removal openings. A lifting arm connector is formed on one of the arms and is used to provide the attachment of a separate lifting arm to the joined hook arms. A threaded connection may be used to attach the lifting arm to the joined hook arms. With the lifting arm attached, the craftperson can then lift the entire manhole cover away from the opening in one movement, using leg muscles to lift and move (instead of back muscles, which are involved in moving manhole covers when using prior art "lever arm" removal tools).

In a preferred embodiment of the present invention, the pair of hook arms is disposed in opposing hook holes (if there are more than two holes formed on the manhole cover surface) so that the perimeter of the entire manhole cover will be held secure. In one embodiment, the locking collar may be a threaded device, which is tightened until a secure attachment between the hook arms is achieved. Advantageously, the use of a threaded device accommodates for slight differences in diameter of various manholes.

Other and further advantages and arrangements of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
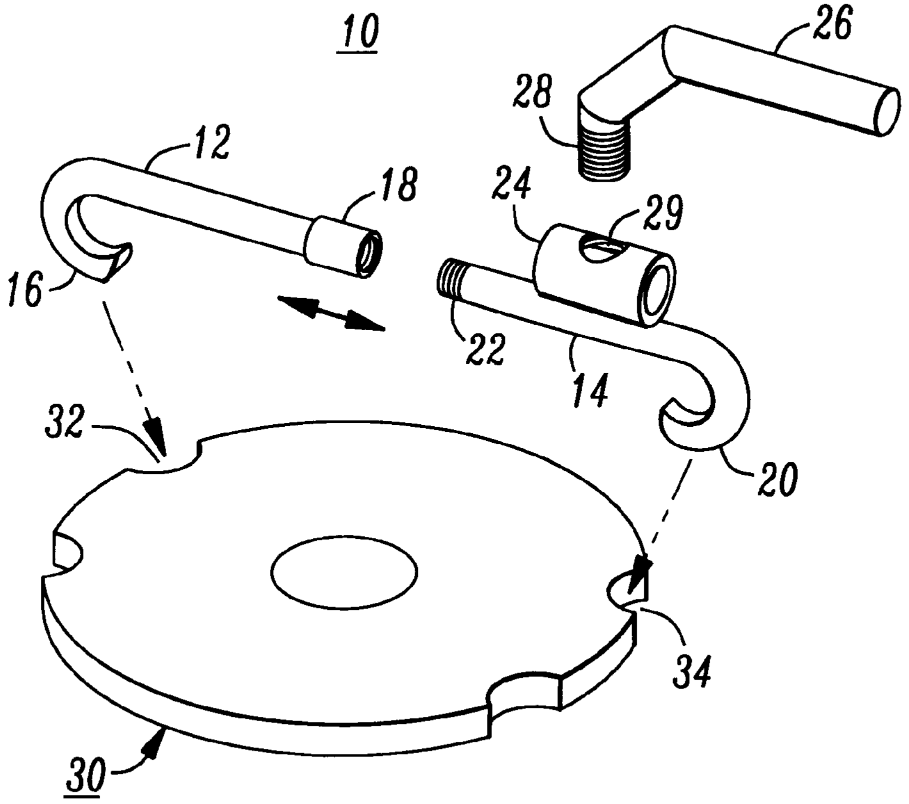
FIG. 1 illustrates, in an exploded view, a conventional manhole cover and an exemplary manhole cover removal tool formed in accordance with the present invention, prior to the insertion of the lifting arm in the tool.

An exemplary manhole cover removal tool 10 formed in accordance with the present invention is illustrated in FIG. 1. For the sake of illustration, a conventional manhole cover 30, including hook holes 32, 34 is shown. However, it is to be understood that the particular design of the manhole cover is exemplary only and the present invention is useful with a variety of manhole cover embodiments. Referring back to FIG. 1, tool 10 comprises a pair of hook arms 12 and 14, where a first hook arm 12 includes a "J"-shaped end 16 and an opposing connector termination 18 where, as discussed below and illustrated in FIG. 2, connector termination 18 is utilized to provide the joining of first hook arm 12 to the second hook arm 14. Second hook arm 14 includes a "J"-shaped end 20 and an opposing connection termination 22 that mates with connection termination 18 of first hook arm 12 to fix the connection between hook arms 12 and 14.

Figure 2:
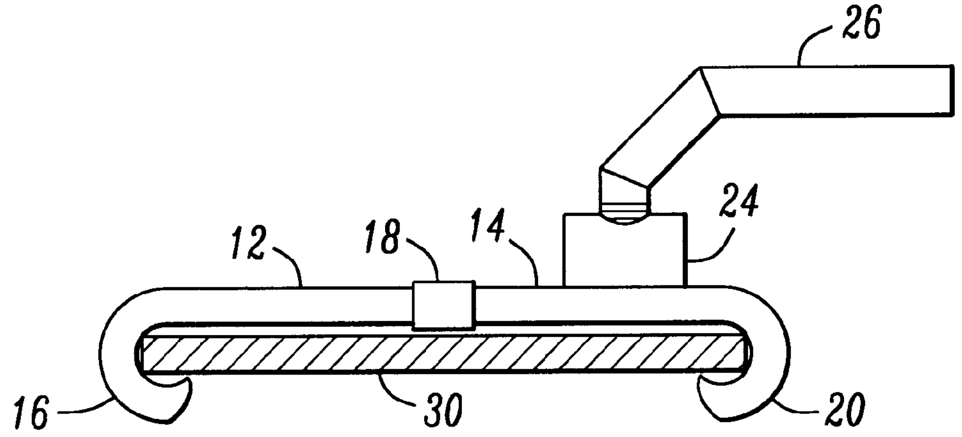
FIG. 2 illustrates the tool of the present invention, in position over a manhole cover, with the two hook arms joined together and the lifting arm secured to the joined hook arms.

As indicated by the dotted lines in FIG. 1, J-shaped end 16 of first hook arm 12 is inserted to engage manhole cover 30 in a first hook hole 32. J-shaped end 20 of second hook arm 14 similarly engages the manhole cover 30 at a second hook hole 34. In accordance with the proper operation of tool 10 of the present invention, first and second hook holes 32,34 are disposed on opposite sides of manhole cover 30 so that once tool 10 is in place, manhole cover 30 can be efficiently lifted and removed. Once the J-shaped ends of arms 12, 14 are inserted in place, connection terminations 18, 22 of the arms may be joined to form a unitary structure across the surface of manhole cover 30. FIG. 2 illustrates tool 10 of the present invention as it is in place over manhole cover 30, with connection termination 18 of first hook arm 12 attached to connection termination 22 of second hook arm 14. In one embodiment of the present invention, connection termination 18 may comprise a collar which is capable of movement along the axis of arm 12 (as indicated by the double-ended arrow in FIG. 1), where the internal surface area of collar 18 is threaded. In this case, connection termination 22 may simply comprise a threaded end portion of second hook arm 14, where the threads of connection termination 22 will mate with collar 18 and provide the desired attachment. Advantageously, the use of a threaded connection allows for adjustment of the connection until the proper fit is achieved. Thus, if various manholes differ slightly in diameter, tool 10 of the present invention, when using a threaded connection, can accommodate these differences.

A lifting arm connector 24 is illustrated in FIG. 1 as attached to hook arm 14 (it may alternatively be attached to hook arm 12). Connector 24 includes an opening 29 for accepting lifting arm 26. FIG. 2 illustrates tool 10 of the present invention with lifting arm 26 engaged in connector 24 of second hook arm 14. In one embodiment of the present invention, a connecting end 28 of lifting arm 26 may be threaded, for attaching to a threaded opening 29 in connector 24. Other means of attaching lifting arm 26 to a hook arm are possible. Indeed, in one embodiment, lifting arm 26 may be permanently attached to a hook arm; however, a permanent attachment reduces the compactness of the tool for storage and transport purposes. A preferred embodiment utilizes the three separate pieces—a pair of hook arms and a lifting arm—so that the three pieces will take up less room when not in used.

While various changes may be made in the detailed construction of the tool of the present invention, it is understood that such changes will be within the spirit and scope of the present invention as defined by the claims appended hereto.

What is claimed is:

1. A manhole cover lifting tool for lifting a manhole cover having at least two lifting holes or slots formed in the surface thereof, said tool comprising a first hook arm having a J-shaped first end and an opposing second end, said J-shaped first end for engaging a first lifting hole in a manhole cover;

a second hook arm having a J-shaped first end and an opposing second end, said J-shaped first end for engaging a second lifting hole in a manhole cover and said second end for attaching to the first hook arm second end;

a threaded lifting arm attached to one of said first and second hook arms, said threaded lifting arm used to lift the manhole cover engaged by said first and second hook arms, wherein either one of the first and second hook arms includes a lifting arm connector for engaging the lift arm in a removable attachment, said threaded lifting arm connector including a threaded end portion for mating with said threaded lifting arm.

2. The manhole cover lifting tool as defined in claim 1 wherein the first hook arm comprises a locking collar at its second end connector for mating with the second end of said second hook arm to form said attachment.

3. The manhole cover lifting tool as defined in claim 2 wherein the locking collar has an inner threaded surface and the second end of the second hook arm is threaded for mating with the inner threaded surface of said locking collar to form the attachment.

* * * * *